United States Patent
Koga

[11] Patent Number: 6,068,966
[45] Date of Patent: *May 30, 2000

[54] METHOD FOR PRINTING BAR-CODES

[75] Inventor: Atsushi Koga, Naka-gun, Japan

[73] Assignee: Mitsubishi Nuclear Fuel Co., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/874,301

[22] Filed: Jun. 13, 1997

[30] Foreign Application Priority Data

Jun. 27, 1996 [JP] Japan .................................... 8-168054

[51] Int. Cl.7 .................................................. B23K 26/02
[52] U.S. Cl. ............... 430/322; 235/462.16; 219/121.85; 430/945
[58] Field of Search ..................................... 430/320, 945, 430/322; 235/462, 463, 454, 494, 462.12, 462.16, 462.17; 219/121.85

[56] References Cited

U.S. PATENT DOCUMENTS

| | | | |
|---|---|---|---|
| 4,585,931 | 4/1986 | Duncan et al. ........................ | 235/464 |
| 4,810,867 | 3/1989 | Speicher .............................. | 235/462.16 |
| 4,822,987 | 4/1989 | Goldenfield et al. .................. | 235/462 |
| 5,175,425 | 12/1992 | Spratte et al. ..................... | 235/462.16 |
| 5,247,154 | 9/1993 | Ahmed ................................. | 235/462 |
| 5,646,391 | 7/1997 | Forbes et al. ......................... | 235/462 |

FOREIGN PATENT DOCUMENTS

| | | |
|---|---|---|
| 2-6782 | 1/1990 | Japan . |
| 3-237389 | 10/1991 | Japan . |
| 6-114576 | 4/1994 | Japan . |
| 7-185846 | 7/1995 | Japan . |
| WO 88/10475 | 12/1988 | WIPO . |
| WO 94/11146 | 5/1994 | WIPO . |

*Primary Examiner*—Martin Angebranndt
*Attorney, Agent, or Firm*—Oblon, Spivak, McClelland, Maier & Neustadt, P.C.

[57] ABSTRACT

The bar-code printing method of the present invention comprises a step of irradiating the circumferential surface of a metal tube with laser beams so as to make at least one group of thin elementary lines arranged in parallel with each other at intervals. The width of the intervals is determined so that each group of elementary lines can be detected as one of the thick lines contained in the bar-code.

8 Claims, 1 Drawing Sheet

METHOD FOR PRINTING BAR-CODES

BACKGROUND OF THE INVENTION

The present invention relates to a method for printing bar-codes on a surface of an object, for example, a nuclear fuel cladding tube, by irradiating the surface of the object with laser beams while scanning. In particular, the present invention relates to a bar-code printing method in which not only physical or chemical influences applied to the object to be printed can be reduced but also printing efficiency can be improved.

The assignee of the present invention has already proposed, in Japanese Patent Application No. 7-265971, a method for printing bar-codes on a surface of an object, for example, a nuclear fuel cladding tube, by irradiating the object with scanned laser beams. In the embodiment of this application, each of the thick lines contained in a bar-code is printed by drawing a plurality of thin lines on a circumferential surface of a fuel cladding tube leaving no interval between them.

According to this bar-code printing method, because the bar-codes are printed by changing the physical or chemical characteristics of the surface of the cladding tube, it is possible to improve the durability and the permanence of the bar-codes; therefore, from this point of view, this method is desirable for printing on fuel cladding tubes the information for the maintenance thereof. In contrast, in the case where bar-codes are printed with an ink as is conventional, such bar-codes do not have sufficient durability and permanence in comparison with those printed by laser beams.

However, the above-described bar-code printing method using laser marking has a certain problem. That is, since high reliability is strongly required in the cladding tube, the physical or chemical influence applied to the cladding tube should be reduced to as low as possible, and, in order to meet this requirement, a decrease in the clarity of the bar-codes is inevitable. Furthermore, because a large number of thin lines should be drawn to make each thick line, the printing speed and efficiency is difficult to improve.

SUMMARY OF THE INVENTION

It is therefore an object of the present invention to provide a bar-code printing method in which not only physical or chemical influences applied to the object to be printed can be reduced but also efficiency of printing can be improved.

In order to accomplish the above object, the bar-code printing method of the present invention comprises a step of irradiating the surface of an object to be printed with laser beams so as to make at least one group of thin elementary lines arranged in parallel with each other at intervals, and the width of the intervals is determined so that each group of elementary lines can be detected as one of the thick lines contained in the bar-code.

According to the method of the present invention, since each of the thick lines in a bar-code is constructed by a plurality of the elementary lines arranged in a parallel manner at constant interval, it is possible to reduce the number of the elementary lines contained in each thick line, in comparison with the case where each thick line is made by closely arranged lines. Therefore, the total degree of the physical or chemical change occurring in the portion on which a bar-code is printed can be reduced, and the physical characteristics, such as corrosion resistance and the mechanical strength, of the object can thereby be improved.

Another object of the present invention is to provide a process for manufacturing a fuel cladding tube having a high reliability. In order to accomplish this object, the process for manufacturing a fuel cladding tube according to the present invention comprises a step of preparing a metal tube having a circumferential surface, and a step of irradiating the circumferential surface of the metal tube with laser beams so as to make at least one group of thin elementary lines arranged in parallel with each other at intervals. The width of the intervals is determined so that each group of elementary lines can be detected as one of the thick lines of a bar-code.

Another object of the present invention is to improve the reliability of a nuclear fuel cladding tube having at least one bar-code printed on a circumferential surface thereof. In order to accomplish this object, the cladding tube of the present invention has a bar-code having at least one thick line consisting of a group of thin elementary lines arranged in parallel with each other at intervals, and the width of the intervals being determined so that each group of elementary lines can be detected as one of the thick lines in a bar-code.

According to the cladding tube of the present invention, even in the case where the thin lines are made by laser beams, it is possible to minimize the total degree of physical or chemical change occurring in the portion on which a bar-code is printed. Therefore, the physical characteristics, such as corrosion resistance and the mechanical strength, of the cladding tube can be maximized.

DETAILED DESCRIPTION OF THE PREFERRED EMBODIMENTS

Figure 1:
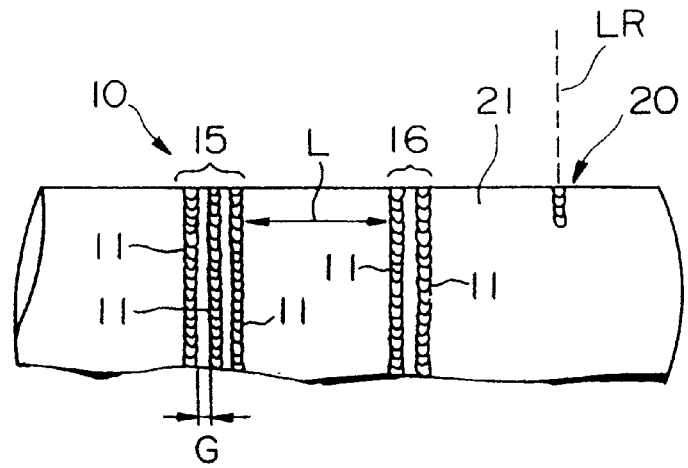
FIG. 1 is a front view showing a part of a fuel cladding tube which has undergone an embodiment of the bar-code printing method according to the present invention.
Figure 2:
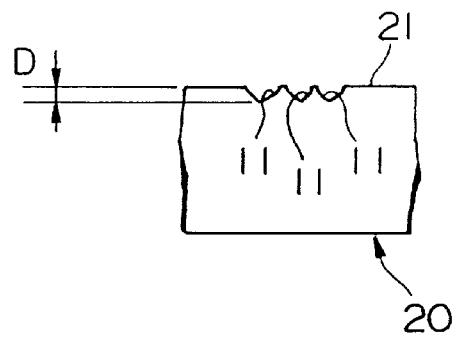
FIG. 2 is an enlarged view of the elementary lines formed in the surface of the cladding tube.
Figure 3:
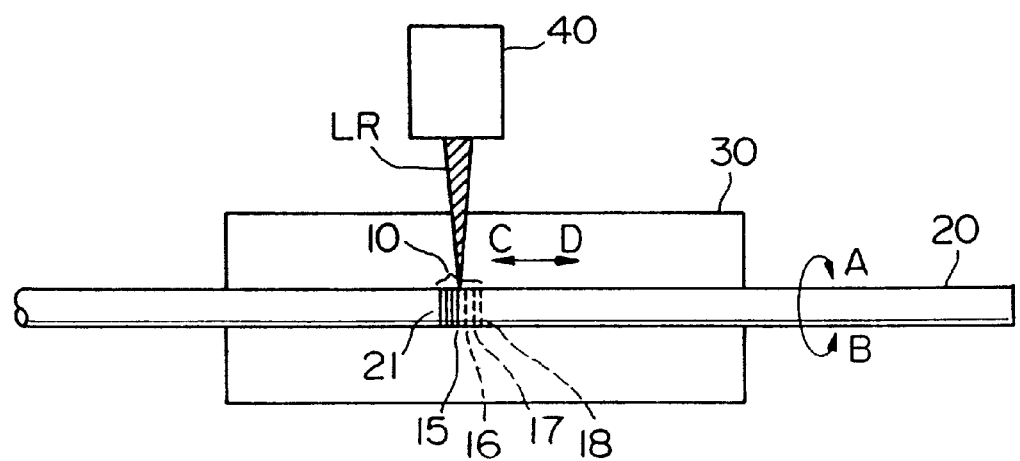
FIG. 3 is a front view showing a situation in which an embodiment of the bar-code printing method of the present invention is conducted.

Referring to FIGS. 1 to 3, the method for printing bar-codes according to an embodiment of the present invention will be explained. In this embodiment, a nuclear fuel cladding tube 20, for accommodating nuclear pellets, made from zircaloy, is used as an object on which bar-codes will be printed. However, the present invention is not limited to application to such cladding tubes, but can also be applied to other objects, for example, metal plates, in which it is desirable to suppress the physical or chemical change of the surface thereof as much as possible.

In this bar-code printing method, first, as shown in FIG. 3, the part of the cladding tube 20 on which a bar-code is to be printed is positioned in a marking chamber 30. The marking chamber 30 is an airtight vessel, and at least a part of the chamber 30 is transparent so that laser beams LR pass therethrough. After closing the marking chamber 30, the chamber 30 is filled with a mixture gas of oxygen and argon.

A laser generator 40 is arranged outside the chamber 30 so as to focus a laser beam LR at a point on the circumferential surface 21 of the cladding tube 20. The laser generator 40 comprises a scanning mechanism for scanning the laser beam LR in a predetermined area of the circumferential surface of the cladding tube 20 and a shifting mechanism for shifting the irradiated point in a direction perpendicular to the scanning direction.

Next, the circumferential surface 21 of the cladding tube 20 is irradiated with the focused laser beam LR while scanning the laser beam LR in the circumferential direction of the cladding tube 20 (see arrows A and B in FIG. 3). As shown in FIG. 2, the irradiated point in the surface 21 of the cladding tube 20 is melted by the heat of the laser beam LR and is oxidized by a reaction with the oxygen contained in the gas in the chamber 30, thus, a plurality of parallel elementary lines 11 are thinly drawn as grooves at intervals on the surface 21 of the cladding tube 20. As shown in FIG. 1, the width G of the intervals is determined so that each group of elementary lines 11 can be optically detected, for example, based on the degree of brightness, by a bar-code reading device, as a thick line 15 contained in the bar-code. As shown in FIG. 2, the depth D of the heat effected portion constituting each elementary line 11 is preferably 10–50 $\mu$m. Generally speaking, in the case where the depth D is less than 10 $\mu$m, the reliability of the optical discrimination of the elementary lines 11 is lowered; conversely, a depth D of more than 50 $\mu$m is undesirable even if the present invention is applied. However, the present invention is not limited to the above depth range.

The maximum of the width G, under which each group of the elementary lines 11 can be detected as a thick line 15, is depend on the resolution of the bar-code reading method or device to be used for reading the bar-code, therefore, a numerical limitation of the width G of the intervals is not universally valid. However, when a typical bar-code reader on the market is used, the width G of the intervals is preferably less than about 0.5 mm, in order to enable the detection of a group of elementary lines 11 as one thick line 15. The necessary number of the elementary lines 11 for constructing each thick line 15 or 16 is determined according to the width of thick line to be printed, the width of thin elementary line 11 drawn by the laser beam LR, and the width G of the intervals between the elementary lines 11.

After the first thick line 15 is made, as shown in FIG. 1, the irradiation area is shifted by a distance L toward a direction C or D shown in FIG. 3, and other thick lines 16–18 are printed in turn by the laser generator 40 in the same manner as that described above, a bar-code 10 is thereby printed.

According to the method of this embodiment, because the bar-code 10 is printed as a physical and chemical change in the surface of the cladding tube 20, the durability and permanence of the bar-codes 10 is very high. In spite of this, since each of the thick lines 15–18 is constructed by a plurality of the elementary lines 11 arranged in a parallel manner at constant interval G, it is possible to reduce the number of the elementary lines 11 contained in each thick line 15–18, in comparison with the case where each thick line is made by closely arranged thin lines. Therefore, the total degree of the physical or chemical change occurring in the portion on which a bar-code is printed can be reduced, and the physical characteristics, such as corrosion resistance and the mechanical strength, of the cladding tube 20 can thereby be improved.

Furthermore, because the number of scan required for printing each thick line is reduced, it is possible to shorten the total time taken to print a bar-code 10, and the printing efficiency can thereby be improved.

In the present embodiment, the elementary lines 11 are formed by forming grooves in the surface of the cladding tube 20; however, depending on the material of the object to be printed, it is also possible to draw the elementary lines 11 only by changing the chemical form of the material contained in the surface of the object.

What is claimed is:

1. A method for forming a bar-code on a surface of an object, comprising:

determining a maximized interval width for an unchanged surface space between spaced apart thin parallel elementary lines comprising at least one segment of the bar-code in accordance with a maximum reading width resolution associated with a particular bar-code reader so that no maximized interval can be resolved by the particular bar-code reader and the spaced apart thin parallel elementary lines can only be read as a thick line by the particular bar-code reader;

forming the at least one bar-code segment on said surface by changing physical or chemical characteristics of at least two portions of said surface to form said spaced apart thin parallel elementary lines while leaving the maximized interval therebetween; and verifying the at least one bar-code segment by reading the at least one-bar code segment using the particular bar-code reader.

2. The method according to claim 1, wherein said forming step further includes using a laser to irradiate said surface which is surrounded by a gas containing oxygen and said thin parallel elementary lines are formed by changing the at least two portions by oxidation of said surface.

3. The method according to claim 1, wherein said forming step further includes using a laser to irradiate said surface so as to form heat affected zones as the at least two portions, said zones having a depth in a range of 10–50 $\mu$m.

4. The method according to claim 1, wherein said unchanged surface space has a width less than 0.5 mm.

5. A process for forming a bar-code on a circumferential surface of a fuel cladding tube, comprising;

preparing a metal tube as said fuel cladding tube;

determining a maximized interval width for an unchanged surface space between spaced apart thin parallel elementary lines comprising at least one segment of the bar-code in accordance with a maximum reading width resolution associated with a particular bar-code reader so that no maximized interval can be resolved by the particular bar-code reader and the spaced apart thin parallel elementary lines can only be read as a thick line by the particular bar-code reader;

forming the at least one bar-code segment on said circumferential surface by changing physical or chemical characteristics of at least two portions of said circumferential surface to form said spaced apart thin parallel elementary lines while leaving the maximized internal therebetween; and verifying the at least one bar-code segment by reading the at least one bar-code segment using the particular bar-code reader.

6. The process according to claim 5, wherein said forming step further includes using a laser to irradiate said circumferential surface which is surrounded by a gas containing oxygen, said thin parallel elementary lines are formed by changing the at least two portions by oxidation of said circumferential surface.

7. The process according to claim 5, wherein said forming step further includes using a laser to irradiate said circumferential surface so as to form heat affected zones as said at least two portions, said zones having a depth in a range of 10–50 $\mu$m.

8. The process according to claim 5, wherein said unchanged circumferential surface space width which is less than 0.5 mm.

\* \* \* \* \*